United States Patent
Grundwürmer et al.

(10) Patent No.: US 6,840,354 B2
(45) Date of Patent: Jan. 11, 2005

(54) BRAKE ACTUATOR

(75) Inventors: Richard Grundwürmer, Ingolstadt (DE); Josef Staltmeir, München (DE); Manfred Vohla, München (DE)

(73) Assignee: Knorr-Bremse Systeme für Schienenfahrzeuge GmbH, Munich (DE)

( * ) Notice: Subject to any disclaimer, the term of this patent is extended or adjusted under 35 U.S.C. 154(b) by 0 days.

(21) Appl. No.: 10/432,720

(22) PCT Filed: Oct. 30, 2001

(86) PCT No.: PCT/EP01/12519

§ 371 (c)(1), (2), (4) Date: Sep. 23, 2003

(87) PCT Pub. No.: WO02/44002

PCT Pub. Date: Jun. 6, 2002

(65) Prior Publication Data

US 2004/0079598 A1 Apr. 29, 2004

(30) Foreign Application Priority Data

Nov. 28, 2000 (DE) .......................................... 100 58 925

(51) Int. Cl.[7] .............................................. F16D 65/21
(52) U.S. Cl. ...................... 188/171; 188/71.1; 188/173
(58) Field of Search ................................ 188/171, 173, 188/71.5, 71.1, 72.1

(56) References Cited

U.S. PATENT DOCUMENTS 4,546,298 A * 10/1985 Wickham et al. ........... 318/372
4,760,895 A * 8/1988 Wickham ................. 185/40 R
5,092,432 A * 3/1992 Taig ........................... 188/72.3
6,722,477 B1 * 4/2004 Wolfsteiner et al. ....... 188/72.9

FOREIGN PATENT DOCUMENTS

| | | |
|---|---|---|
| DE | 30 48 766 A1 | 12/1980 |
| DE | 199 06 277 A1 | 2/1999 |
| DE | 199 45 702 A1 | 9/1999 |
| EP | 0 738 643 A1 | 1/1996 |

* cited by examiner

Primary Examiner—Matthew C. Graham
(74) Attorney, Agent, or Firm—Barnes & Thornburg LLP

(57) ABSTRACT

The invention relates to a brake actuator, especially for a rail vehicle brake, comprising a service brake unit with a brake force generator for applying and/or releasing the brake, an accumulator brake unit with an energy accumulator device for accumulating and delivering energy for applying the brake as an operative emergency brake and/or as a parking brake, and a force conversion device for converting the energy that is provided by the brake force generator and/or the energy accumulator device into a brake application movement. The invention provides that the brake actuator has an additional energy accumulator device for accumulating and delivering energy for applying and/or releasing the brake. The additional energy accumulator device and the brake force generator can be designed in such a way that the force required of the brake force generator during a braking operation in order to generate a defined brake application force level that is greater than zero but less than the maximum brake force is zero.

14 Claims, 4 Drawing Sheets

BRAKE ACTUATOR

BACKGROUND AND SUMMARY OF THE INVENTION

State of the Art

The invention is based on a brake actuator, particularly for a rail vehicle brake.

Essentially, three braking systems are currently used in the rail vehicle field: pneumatic or electro-pneumatic braking systems, hydraulic or electro-hydraulic braking systems as well as mechanical or electro-mechanical braking systems. The braking system may be constructed as an active or passive braking system, depending on whether the force of the brake actuator is to be applied for an engaging (active braking system) or a releasing of the brake (passive braking system). In the event of operating disturbances, in the case of pneumatic systems, an energy accumulation takes place in compressed-air reservoirs; in the case of hydraulic systems, an energy accumulation takes place in hydraulic reservoirs; and in the case of mechanical systems, an energy accumulation takes place in the form of accumulator-type springs.

From US Patent Document U.S. Pat. No. 4,546,298, an electromechanical rail vehicle brake is known which has a service brake unit as well as an energy storage brake unit with an energy accumulator. The service brake unit contains a braking force generator for the application and/or release of the brake, for example, in the form of an electric-motor drive. The energy storage brake unit comprises at least one energy accumulator for storing and supplying energy for the application of the brake as an operational emergency brake in the event of a failure of the service brake unit, and/or as a parking brake. The energy storage brake is generally constructed as a spring-loaded brake. An energy converter carries out a conversion of the energy supplied by the braking force generator and/or by the energy accumulator to a brake application movement and comprises, for example, a brake spindle driven by the electric-motor drive.

Since the entire braking force or the entire releasing force is applied by the electric-motor drive as the braking force generator, the drive has to be designed for a high output torque. The braking force generator is therefore relatively large and consequently also relatively heavy and expensive.

U.S. Patent Document U.S. Pat. No. 4,784,244 describes an electrically operable brake actuator with an accumulator-type spring which, in the event of a service braking, builds up a fraction of the braking force.

SUMMARY OF THE INVENTION

An additional energy accumulator in the form of the accumulator-type spring and the braking force generator are designed such that the force to be applied by the braking force generator during a braking for generating a defined braking pressure in a defined operating point, which is greater than zero and smaller than the maximal braking force, amounts to zero. Thus the braking force generator does not have to generate an additional braking force in the defined operating point. Rather, the braking force is then generated by the accumulator-type spring alone. For reaching a maximal braking force, the braking force generator assists the accumulator-type spring. For generating lower braking forces, the braking force generator counteracts the force of the accumulator-type spring. The braking force generator therefore acts as only an assisting drive in both load directions for applying the maximal braking force as well as for releasing the brake. The system thereby combines important advantages of a passive braking system with those of an active braking system. However, an accumulator-type spring for the brake application can be smaller than in a purely passive braking system because it does not have to apply the maximal braking force alone but together with the braking force generator. On the other hand, the braking force generator, for example, an electric motor, may also have smaller dimensions than in the case of purely active brake systems because also the braking force generator generates the braking force not alone but together with the accumulator-type spring.

The accumulator-type spring can be activated jointly with the one energy accumulator in the event of an emergency and/or parking braking in the brake application direction. Thus, it contributes, not only during service brakings but also during parking and/or emergency brakings, to the generating of braking force. For this reason, not only the braking force generator but also the one energy accumulator may have smaller dimensions. Furthermore, safety is increased because, as a result of the accumulator-type spring as an additional energy accumulator, a redundancy exists in the case of parking and/or emergency brakings.

The accumulator-type spring is mechanically connected in parallel with respect to the braking force generator and with respect to an energy accumulator and, in the event of a service braking, can be operated together with the braking force generator in the brake application direction. The accumulator-type spring will then be designed such that, by means of it, when the braking force generator is not active, a defined, preferably a medium, braking force can be generated.

Also, the accumulator-type spring is constructed as a radially exterior accumulator-type spring which radially surrounds the interior accumulator-type spring, which forms the energy accumulator, whereby a particularly space-saving arrangement is created.

These and other aspects of the present invention will become apparent from the following detailed description of the invention, when considered in conjunction with accompanying drawings.

DETAILED DESCRIPTION OF THE PREFERRED EMBODIMENTS

Figure 1:
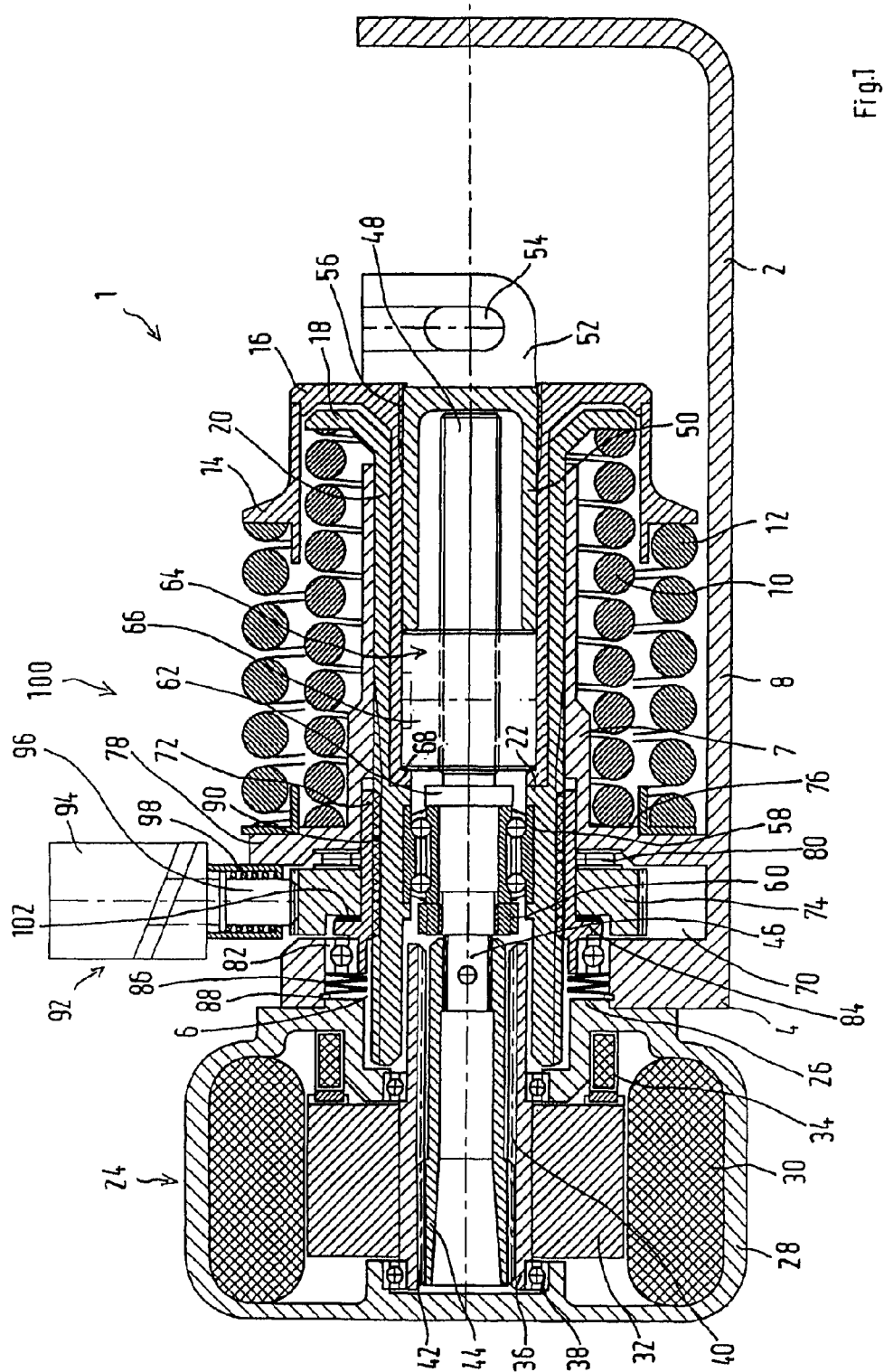
FIG. 1 is a sectional view of a preferred embodiment of a brake actuator according to the invention in a release position.

The preferred embodiment of a brake actuator which, as a whole, is marked by reference number 1 in FIG. 1 and is illustrated in a release position, is used as a driving unit of an electro-mechanical brake application device of a rail vehicle. The brake actuator 1 has an essentially hollow-cylindrical actuator housing 2 which in FIG. 1 is illustrated in a broken-off fashion and which is closed off by a lid section 4 toward an axial end. The lid section 4 has a centered bore 6. Starting from the lid section 4, the actuator housing 2 has an essentially double-walled construction. An internal accumulator-type spring 10 and an external accumulator-type spring 12 coaxial thereto are arranged in the space between an interior wall 7 and an exterior wall 8. The external accumulator-type spring 12 encloses the internal accumulator-type spring 10.

The accumulator-type springs 10, 12 are shown as coil springs and are in each case supported by one of their ends at the lid section 4. The external accumulator-type spring 12 is supported by its other end on a ring collar 14 of an outer sliding sleeve 16. The internal accumulator-type spring 10 is supported by its other end on a ring collar 18 of an inner sliding sleeve 20. The inner sliding sleeve 20 is between the outer sliding sleeve 16 and the interior wall 7 of the actuator housing 2. Furthermore, the inner and the outer sliding sleeve 16, 20 are slidably guide in the axial direction on one another. The inner sliding sleeve 20 is slidably guided on a radially interior circumferential surface of the interior wall 7 of the actuator housing 2. In the release position, the outer sliding sleeve 16 comes to rest on an axial stop 22 of the inner sliding sleeve 20. Furthermore, the ring collar 14 of the outer sliding sleeve 16 projects over the ring collar 18 of the inner sliding sleeve 20 in the axial and radial direction.

On the side facing away from the accumulator-type springs 10, 12, a motor, for example, an SR motor 24 (switched reluctance motor), which can be operated in the four-quadrant operation, is connected to the lid section 4. An axial ring projection 26 of the motor housing 28 is centered in the bore 6 of the lid section 4. The SR motor 24 contains a radially exterior housing-fixed stator 30 which encloses a rotor 32. The rotor 32 can be braked by a blocking brake 34, for example a permanent-magnet brake, which is closed when it is not energized and opened when it is energized. The rotor 32 is disposed on a hollow shaft 36 which, by way of ball bearings 38, is rotatably disposed in the motor housing 28. The shaft 36 is equipped on its radially interior circumferential surface with an axially extending spline toothing 40 in which radially exterior wings 42 of an intermediate sleeve 44 engage which extend in the axial direction. The intermediate sleeve 44 is therefore non-rotatably but axially displaceably guided relative to the hollow shaft 36.

An end-side pin 46 of a brake spindle 48 projects coaxially into an end of the intermediate sleeve 44 facing the accumulator-type springs 10, 12 and is held there in a non-rotatable and axially fixed manner. The other end of the brake spindle 48 projects into a cup-shaped section 50 of a connecting rod 52 for an eccentric-shaft lever, which is not shown. For this purpose, the connecting rod 52 has an oblong hole 54 on the end side, into which a load sensing bolt can engage which holds the eccentric-shaft lever. The eccentric-shaft lever acts upon a caliper which is not shown for reasons of scale. The cup-shaped section 50 of the connecting rod 52 is held in the outer sliding sleeve 16 and is connected thereto, for example, by a thread 56.

The brake spindle 48 is rotatably disposed inside the inner sliding sleeve 20 a double-row deep-groove ball bearing 58 which can absorb axial as well as radial forces. An inner race of the ball bearing 58 is tensioned by a nut 60 screwed onto an external thread section of the brake spindle 48 against a shoulder 62 of the brake spindle 48. As a result, the inner race is non-rotatably and in an axially fixed manner held on the brake spindle 48. An outer race of the of the deep groove ball bearing 58 is also non-rotatably and in an axially fixed manner held in the inner sliding sleeve 20.

The brake spindle 48 is embraced by a nut/spindle constructional unit 64 which may be constructed as a rolling thread drive, such as a recirculating ball spindle, a threaded roller gear drive or as a planetary rolling thread drive. In this case, the cup-shaped section 50 of the connecting rod 52 is screwed into the outer sliding sleeve 16 to such an extent that the nut 66 of the nut/spindle constructional unit 64 is clamped in between a radially interior projection 68 of the outer sliding sleeve 16 and a face of the cup-shaped section 50 of the connecting rod 52. Thus, the nut 66 is held in a torsion-proof manner with respect to the latter. During rotations of the brake spindle 48, the nut 66 is therefore translationally guided along the brake spindle 48 and, in the process, takes along or moves the outer sliding sleeve 16 and the connecting rod 52.

The lid section 4 of the actuator housing 2 includes an annulus 70 housing a gear wheel 74 which is disposed on a locking nut 72, both of which are received coaxially with respect to the brake spindle 48. A surface 76 of a radially extending wall 78 of the lid section 4, which wall 78 bounds the annulus 70 and which surface 76 points away from the annulus 70, forms the supporting surface for one end respectively of the interior and exterior accumulator-type spring 10, 12. On the other surface of the wall 78 pointing to the annulus 70, a ring recess is provided in which an axial needle bearing 80 holds the gear wheel 74 axially disposed with respect to the actuator housing 2. The locking nut 72 is disposed on the other side of the gear wheel 74 pointing away from the axial needle bearing 80. A radial deep groove ball bearing 82 separates the gear wheel 74 and the actuator housing 2. An inner race of the deep groove ball bearing 82 is tensioned against a projection 84 of the locking nut 72 by a spring 86 which is secured in its position by a snap ring 88 disposed in the actuator housing 2. By the effect of the spring 86, the gear wheel 74 is therefore held in a force-locking manner between the projection 84 of the locking nut 72 and the axial needle bearing 80.

The locking nut 72 engages the inner sliding sleeve 20 and is rotatably disposed thereon by a non-self-locking thread 90. In addition, a magnetic locking device 92 with a coil 94 and a locking piston 96, which can be radially operated with respect to the gear wheel 74, is provided. When the coil 94 is energized, the locking piston 96 extends against the effect of a return spring 98, viewed in the circumferential direction, between the teeth of the gear wheel 74 and thereby locks it in its rotating position relative to the inner sliding sleeve 20. In contrast, when the coil 94 is not energized, the locking piston 96 is radially withdrawn by the return spring 98 and permits a free rotation of the gear wheel 74 with respect to the inner sliding sleeve 20.

The SR motor 24 forms a braking force generator; the additional elements of the force transmission path from the SR motor 24 to the caliper form a braking force converting device 100. However, as an alternative, the braking force generator may also be a hydraulic or pneumatic brake cylinder acting into one or two operating directions, or another unit acting into one or two directions. The locking device 92, the permanent magnet brake 34 and the SR motor 24 can be controlled by an electronic controlling and regulating device which is not shown. Considering this background, the brake actuator 1 has the following function:

In the release position of the brake actuator 1 illustrated in FIG. 1, the exterior and the interior accumulator-type spring 10, 12 are prestressed. The force of the interior accumulator-type spring 10 is transmitted from the inner sliding sleeve 20 by way of the non-self-locking thread 90 to the locking nut 72 and, from there, by way of the gear wheel 74 to the extended piston 96 of the locking device 92. As a result of the spring force, a torque is generated in the non-self-locking thread 90; that is, the gear wheel 74 wants to rotate together with the locking nut 72, which, however, is prevented by the extended piston 96 of the locking device 92.

The force of the exterior accumulator-type spring 12 is supported by the outer sliding sleeve 16 on the nut 66 of the nut/spindle constructional unit 64, although the nut/spindle constructional unit 64 is non-self-locking. The reason is that the torque created because of the force of the exterior accumulator-type spring 12 in the brake spindle 48 is introduced by way of the permanent magnet brake 34, which is closed in the release position, into the actuator housing 2. From the nut 66, the force runs by way of the brake spindle 48 and the double-row deep-groove ball bearing 58 into the inner sliding sleeve 20 and, from there, takes the same path into the gear wheel 74 as the force of the interior accumulator-type spring 10. This means that, in the release position, the exterior as well as the interior accumulator-type spring 10, 12 are held in the tensioned state by the locking device 92.

Figure 4:
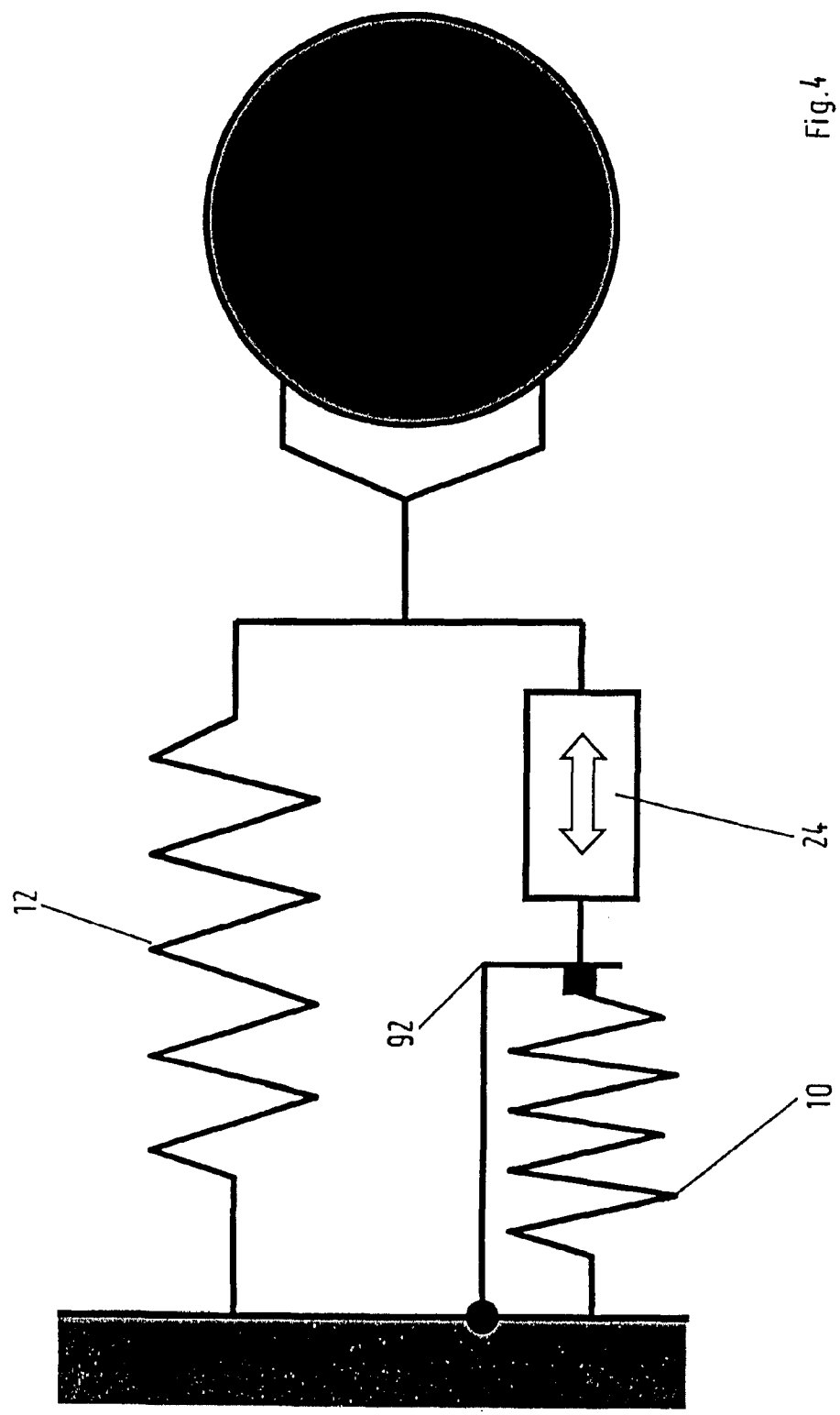
FIG. 4 is a very schematic view of the brake actuator of FIG. 1.

During the transition from the release position to a service braking, the permanent magnet brake 34 is energized by the electronic controlling and regulating device. This causes the brake to open and permit a rotation of the SR motor 24 which is also supplied with electric energy by the controlling and regulating device. As a result of the rotation of the rotor 32 and of the brake spindle 48, the nut 66 of the nut/spindle constructional unit 64, together with the outer sliding sleeve 16 and the connecting rod 52, is moved into the moved-out service brake position illustrated in FIG. 2. This moving-out movement of the connecting rod 52 is supported by the exterior accumulator-type spring 12 which, relative to the function, is connected parallel to the SR motor 24, as schematically illustrated in FIG. 4.

The controlling of the SR motor 24 by the controlling and regulating device and the exterior accumulator-type spring 12 are mutually coordinated such that the exterior accumulator-type spring 12 alone generates a defined braking force value, which is between a minimal and a maximal braking force and defines an operational zero point. In the operational zero point, the SR motor SR 24 is switched currentless. The amount of the braking force acting in the operational zero point is therefore, among other things, a function of the spring rate of the exterior accumulator-type spring 12 and the degree of the prestressing. For achieving the maximal braking force, the SR motor 24 is controlled by the controlling and regulating device in the four-quadrant operation such that it supports the exterior accumulator-type spring 12 by a rotation in the brake application direction and by the supplying of a positive torque, which corresponds, for example, to an operation in the first quadrant. For reaching a braking force lower than in the operational zero point, the SR motor 24 rotates against the brake application direction and supplies a negative torque which, by way of the nut/spindle constructional unit 64, acts against the exterior accumulator-type spring 12 (operation in the third quadrant). The interior accumulator-type spring 10 does not participate in the generating of the service braking force and remains in the tensioned condition because, as a result of the continuously locked locking device 92, the gear wheel 74 is in the blocking position.

Figure 3:
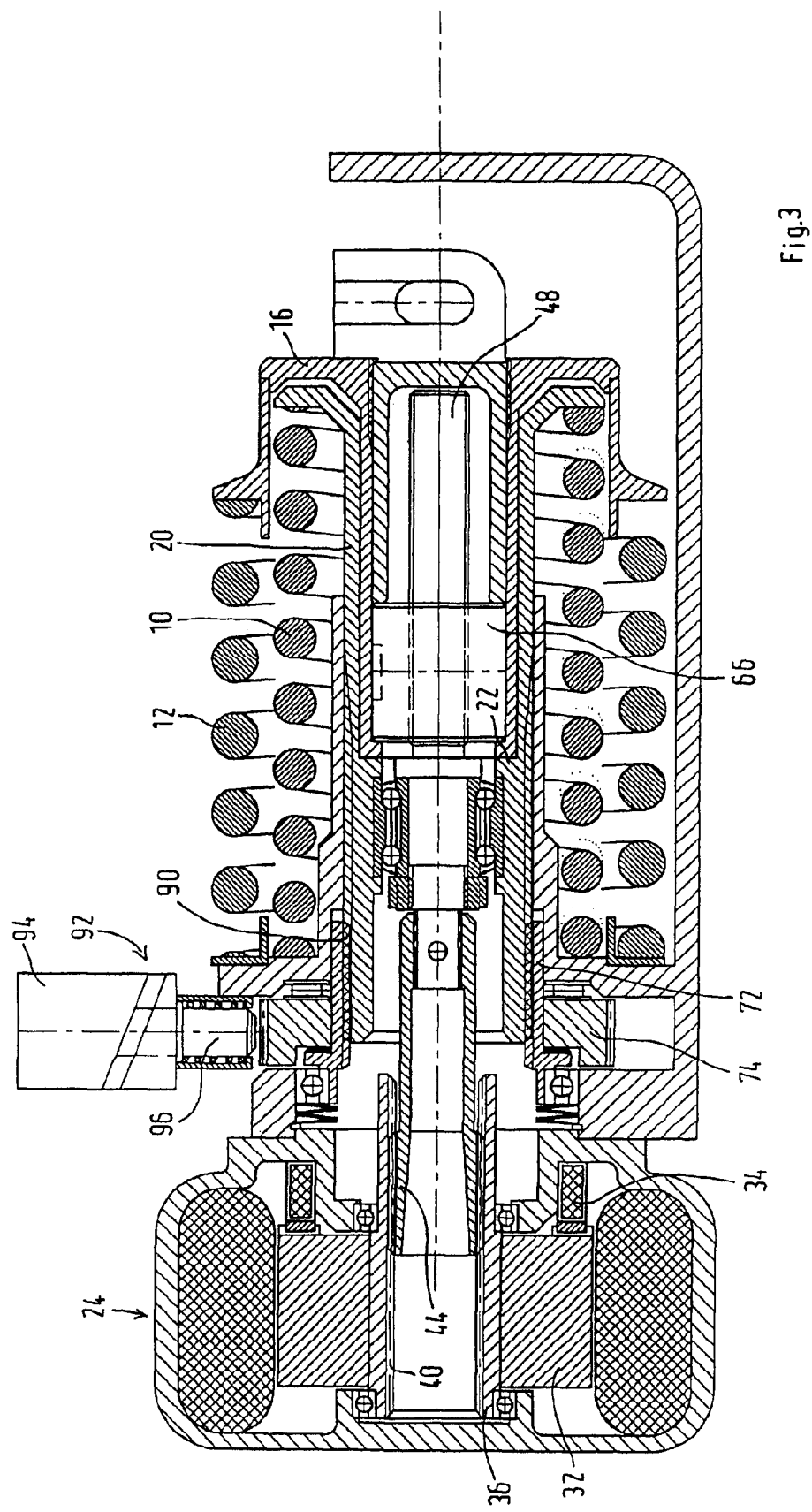
FIG. 3 is a view of the brake actuator of FIG. 1 in an emergency or parking braking position.

The engaging of the parking brake is initiated by the above-described service braking until a braking force is reached which is approximately 20% lower than the final force to be achieved by means of the parking brake. By means of corresponding control signals of the control device, the SR motor 24 is stopped; by interrupting the power supply, the permanent magnet brake 34 is moved into the braking position; and the locking device 92 is released by switching off the energizing. This situation is illustrated in FIG. 3. Because of the spring force acting upon the inner sliding sleeve 20 and generated by the interior accumulator-type spring 10, a torque is generated in the non-self-locking thread 90 between the locking nut 72 and the inner sliding sleeve 20, which torque is no longer supported by the retracted locking piston 96. Consequently, the locking nut 72 starts to rotate on the inner sliding sleeve 20, which then moves into the brake application direction and by way of its axial stop 22, takes along the outer sliding sleeve 16 with the connecting rod 52. Simultaneously, because of the spring force of the exterior accumulator-type spring 12, the unlocked outer sliding sleeve 16 can move in the brake application direction. In this case, it is unimportant whether the permanent magnet brake 34 is opened or closed because the intermediate sleeve 44, together with the brake spindle 48, is axially displaced in this process in the spline toothing 40 of the hollow shaft 36 of the rotor 32, as illustrated in FIG. 3. In the parking brake position, a total braking force is therefore active which is the result of the sum of the spring forces of the two parallel-acting accumulator-type springs 10, 12. This situation is also illustrated in FIG. 4, in which case, after the releasing of the locking device 92 illustrated as a rocker lever, the interior accumulator-type spring 10, together with the exterior accumulator-type spring 12, builds up the braking force at the brake shoes. The entire energy supply can then be switched off and the rail vehicle is held by the spring forces of the inner and outer accumulator-type spring 10, 12 reliably in the parking brake position. In order to maintain the resulting achieved parking braking force for an extended time period, only a low relaxation may be permitted at the interior and the exterior accumulator-type spring 10, 12.

If the power supply of the brake actuator 1 and/or die controlling and regulating device fails during a service braking, the coil 94 of the locking device 92 is no longer energized so that the locking piston 96 releases the gear wheel 74. The subsequent events are identical to those described with respect to the parking braking, so that, also in the event of an emergency or safety braking, the total braking force is the result of the sum of the spring forces of the two parallel acting accumulator-type springs 10, 12.

Figure 2:
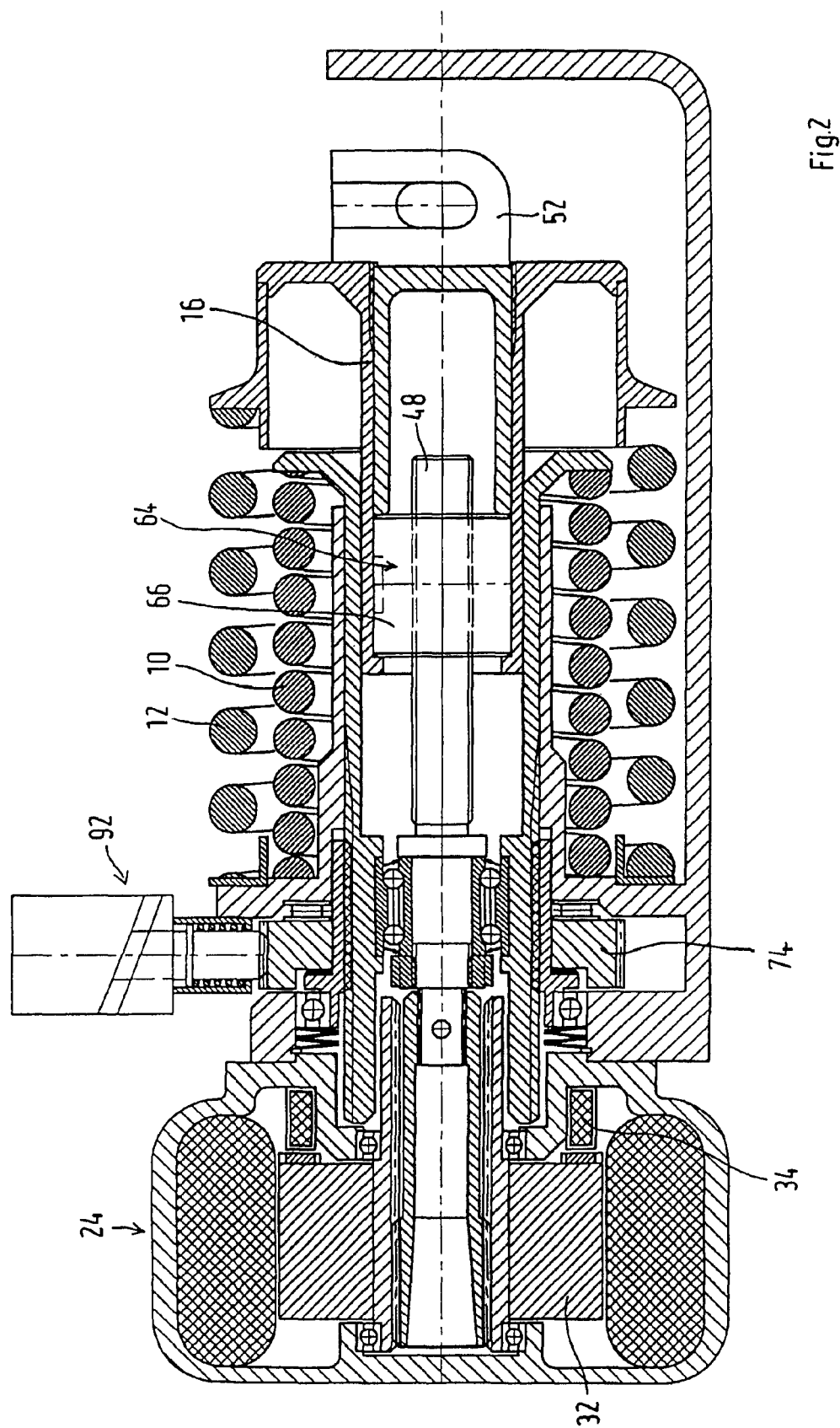
FIG. 2 is a view of a brake actuator of FIG. 1 in a service braking position.

The release of the brake, starting from the parking braking or emergency braking position takes place in two steps, the interior accumulator-type spring 10 being tensioned first. The permanent magnet brake 34 is energized by the controlling and regulating device and is therefore opened, and the SR motor 24 is driven in the brake application direction. In this case, the rotating brake spindle 48 is supported on the nut 66 of the nut/spindle constructional unit 64 and, together with the inner sliding sleeve 20, moves in the direction toward the release position. The locking nut 72 rotates on the inner sliding sleeve 20 while the locking device 92 is opened. However, this can also take place when the locking device 92 is closed by means of a free wheel 102 between the locking nut 72 and the gear wheel 74. The free wheel 102 permits a rotating of the locking nut 72 with respect to the gear wheel 74 when the interior accumulator-type spring 10 is tensioned. A rotating in the opposite direction is not possible. When the tensioned condition of the interior accumulator-type spring 10, which corresponds to the condition in the release position, has been reached, the SR motor is stopped by the controlling and regulating device and is moved into the locking position by the energizing of the coil 94 of the locking pistons 96, as shown in FIG. 2.

In another step, the exterior accumulator-type spring 12 in tensioned in that the SR motor 24 is operated in the opposite rotating direction, that is, in the release direction, in which case the brake spindle 48 supported on the locked inner sliding sleeve 20, as a result of its rotation, screws the nut 66 of the nut/spindle constructional unit 64, together with the outer sliding sleeve 16, in the direction of the release position. Then the SR motor 24 is switched off and the permanent magnet brake 34 is moved into the braking position by the interruption of the power supply, as shown in FIG. 1.

Although the present invention has been described and illustrated in detail, it is to be clearly understood that this is done by way of illustration and example only and is not to be taken by way of limitation. The scope of the present invention is to be limited only by the terms of the appended claims.

What is claimed is:

1. A brake actuator for a rail vehicle brake comprising:
   a) a service brake unit having a braking force generator for the application and/or release of the brake,
   b) an energy storage brake unit having a first energy accumulator for accumulating and supplying energy for the application of the brake as one or more of an operational emergency brake and a parking brake,
   c) a force conversion device for converting the energy supplied by one or more of the braking force generator and the first energy accumulator to a brake application movement,
   d) a second energy accumulator for accumulating and supplying energy for the application of the brake and including at least one accumulator-type spring mechanically and operably connected in parallel to the braking force generator and to the first energy accumulator,
   e) the brake force generator and the accumulator-type spring being mutually coordinated such that, during a service braking,
      the accumulator-type spring alone generates a defined braking force between a minimal and a maximal braking force, or
      the accumulator-type spring and braking force generator, in an addition of force, generate a braking force higher than the defined braking force, or
      the accumulator-type spring and the braking force generator, in a subtraction of force, generate a braking force lower than the defined braking force, and
   f) the accumulator-type spring, together with the first energy accumulator, in the event of an emergency braking and/or parking braking, being activated in the brake application direction.

2. The brake actuator according to claim 1, wherein the braking force generator is an electric motor which can be operated in a four-quadrant operation.

3. The brake actuator according to claim 2, wherein the accumulator-type spring is a radially exterior accumulator-type spring which embraces a radially interior accumulator-type spring of the first energy accumulator.

4. The brake actuator according to claim 3, wherein one end of the interior accumulator-type spring and one end of the exterior accumulator-type spring are supported on an actuator housing, and another end of the interior accumulator-type spring is supported on an inner sliding sleeve, and another end of the exterior accumulator-type spring is supported on an outer sliding sleeve.

5. The brake actuator according to claim 4, wherein the inner and the outer sliding sleeve are arranged coaxial to one another and are displaceably guided on one another in the axial direction, the outer sliding sleeve engages an axial stop of the inner sliding sleeve against the brake application direction.

6. The brake actuator according to claim 5, wherein the outer sliding sleeve is connected with a connecting rod for applying the application force to a caliper.

7. The brake actuator according to claim 3, wherein the electric motor is mechanically connected in series with the interior accumulator-type spring and is mechanically connected in parallel with the exterior accumulator-type spring.

8. The brake actuator according to claim 4, wherein the force conversion device contains a nut/spindle constructional unit with a brake spindle to which the electric motor is axially applied, the nut/spindle constructional unit converting the rotating movements of the electric motor into a linear displacement of the brake spindle.

9. The brake actuator according to claim 8, wherein the interior accumulator-type spring and the exterior accumulator type spring are arranged coaxially with respect to the brake spindle.

10. The brake actuator according to claim 2, including a permanent magnet brake with the electric motor wherein the magnet brake is closed when it is not energized and opened when it is energized.

11. The brake actuator according to claim 8, wherein a nut of the nut/spindle constructional unit is non-rotatably held by the outer sliding sleeve.

12. The brake actuator according to claim 8, wherein the brake spindle is axially displaceably but non-rotatably with respect to and guided in a hollow shaft of the electric motor or a transmission.

13. The brake actuator according to claim 12, wherein the brake spindle is rotatably but axially fixedly disposed inside the inner sliding sleeve.

14. The brake actuator according to claim 13, including an electromagnetically operable locking device for locking the axial position of the inner sliding sleeve.

* * * * *